United States Patent
Norrie

(10) Patent No.: US 12,487,828 B2
(45) Date of Patent: Dec. 2, 2025

(54) PROCESSOR HAVING SWITCH INSTRUCTION CIRCUIT

(71) Applicant: Microchip Technology Inc., Chandler, AZ (US)

(72) Inventor: Christopher I. W. Norrie, Castro Valley, CA (US)

(73) Assignee: Microchip Technology Inc., Chandler, AZ (US)

(*) Notice: Subject to any disclaimer, the term of this patent is extended or adjusted under 35 U.S.C. 154(b) by 68 days.

(21) Appl. No.: 18/534,203

(22) Filed: Dec. 8, 2023

(65) Prior Publication Data
US 2024/0394062 A1    Nov. 28, 2024

Related U.S. Application Data

(60) Provisional application No. 63/468,462, filed on May 23, 2023.

(51) Int. Cl.
*G06F 9/38* (2018.01)
*G06F 9/30* (2018.01)

(52) U.S. Cl.
CPC ........ *G06F 9/3802* (2013.01); *G06F 9/30054* (2013.01); *G06F 9/30061* (2013.01); *G06F 9/3016* (2013.01)

(58) Field of Classification Search
None
See application file for complete search history.

(56) References Cited

U.S. PATENT DOCUMENTS

| 6,076,141 A * | 6/2000 | Tremblay | G06F 9/345 365/49.17 |
| 6,775,763 B2 * | 8/2004 | Sexton | G06F 9/30174 712/E9.037 |
| 6,983,361 B1 * | 1/2006 | Blandy | G06F 9/3017 712/E9.05 |

(Continued)

OTHER PUBLICATIONS

Machine Translation of Korean Patent Application KR 20070055858 A, 2007. (Year: 2007).*

(Continued)

*Primary Examiner* — Steven G Snyder
(74) *Attorney, Agent, or Firm* — Glass & Associates; Alan Heimlich; Kenneth Glass

(57) ABSTRACT

In one implementation a processor has an instruction fetch circuit fetching instructions, the instruction fetch circuit having an input and an output and a decode circuit to decode the fetched instructions, the decode circuit having a first and second input, and an output, wherein the decode circuit first input is coupled to the instruction fetch circuit output receiving the fetched instructions, and an execution circuit executing the decoded fetched instructions, the execution circuit having an input coupled to the decode circuit output to receive the decoded fetched instructions, and a switch instruction circuit (SIC) to detect and execute switch instructions of the fetched instructions, the SIC having an input and an output, wherein the SIC input is coupled to the instruction fetch circuit output to receive the fetched instructions, wherein the SIC output is coupled to the decode circuit second input and the instruction fetch circuit input.

12 Claims, 17 Drawing Sheets

(56) References Cited

U.S. PATENT DOCUMENTS

| | | | | |
|---|---|---|---|---|
| 7,124,283 | B2* | 10/2006 | Yamada | G06F 9/3879 |
| | | | | 717/136 |
| 7,702,499 | B1* | 4/2010 | Lavagno | G06F 11/3457 |
| | | | | 703/27 |
| 9,298,467 | B2* | 3/2016 | Jackson | G06F 9/3806 |
| 9,715,374 | B2* | 7/2017 | Shimamura | G06F 8/425 |
| 10,459,707 | B2* | 10/2019 | Isshiki | G06F 8/31 |
| 2002/0184479 | A1* | 12/2002 | Sexton | G06F 9/30174 |
| | | | | 712/E9.037 |
| 2004/0003204 | A1* | 1/2004 | Yamada | G06F 9/30174 |
| | | | | 712/E9.067 |
| 2014/0201509 | A1 | 7/2014 | Jackson | |
| 2015/0363177 | A1* | 12/2015 | Shimamura | G06F 8/425 |
| | | | | 717/142 |
| 2016/0062954 | A1* | 3/2016 | Ruff | G06F 40/205 |
| | | | | 715/249 |
| 2018/0165079 | A1* | 6/2018 | Isshiki | G06F 8/53 |
| 2018/0253547 | A1 | 9/2018 | Sultana et al. | |
| 2024/0427602 | A1* | 12/2024 | Tessarolo | G06F 9/30061 |

OTHER PUBLICATIONS

Machine Translation of Chinese Patent Application CN 107273177 B, 2020. (Year: 2020).*

PCT/US2023/083379, International Search Report and Written Opinion, European Patent Office, Rijswijk ND, Mar. 19, 2024.

* cited by examiner

1000

1002

Wherein the switch instruction circuit executes a first instruction located in a switch table at a switch table entry address.

Wherein the switch instruction includes a size for one or more fixed sized instruction blocks in a switch table, and a pointer address to a first instruction in the one or more fixed sized instruction blocks in the switch table to execute.

When the pointer address to the first instruction in the one or more fixed sized instruction blocks in the switch table to execute exceeds an address of a combined sizes of the one or more fixed sized instruction blocks in the switch table the pointer address of the first instruction to execute is adjusted to an address of a last of the one or more fixed sized instruction blocks in the switch table.

When the one or more fixed sized instruction blocks that is called has a first instruction of a jump (JUMP instruction) nothing is pushed onto a stack as a result of the first instruction being the JUMP instruction.

When the one or more fixed sized instruction blocks that is called has a first instruction of a call (CALL instruction) an address past the end of a combined sizes of the one or more fixed sized instruction blocks is pushed onto a stack regardless of which of the one or more fixed sized instruction blocks are called as a result of the first instruction being the CALL instruction.

Wherein a circuit calculates an instruction address of a first instruction following the switch table.

Wherein the switch instruction provides an instruction address of a switch table entry to execute.

When the calculated instruction address of the switch table entry to execute is beyond an address that is a sum of a starting address of a switch table and the combined sizes of the one or more fixed sized instruction blocks switch table entries then the calculated instruction address is set to a last switch table entry.

FIG. 17

PROCESSOR HAVING SWITCH INSTRUCTION CIRCUIT

CROSS-REFERENCE TO RELATED APPLICATIONS

The present application claims priority to U.S. Provisional Patent Application Ser. No. 63/468,462 filed on May 23, 2023, the contents of which are incorporated by reference herein in their entirety.

BACKGROUND

Processors generally work on machine code instructions, also known as opcodes, which are difficult to decipher. The machine code instructions reflect what the respective processor is electrically arranged to implement. One level above machine code is assembler code, which is basically a more readable version of the opcode. A machine code instruction, and the respective assembler code instruction, may be called a processor instruction, in that the instruction is handled "as is" by the processor. Higher level programming languages exist, with associated respective compilers, which convert instructions in the higher level language into a string of machine code instructions for the respective processor. Higher level programming languages often have "switch" instructions, which is a type of selection control mechanism used to allow the value of a variable or expression to change the control flow of program execution via search and map. For example, C++ and C# have the "switch" instruction and Visual Basic has the "select" instruction. Compilers reduce these to machine-code instructions that perform a series of conditional jumps to finally arrive at the address of the instructions for each case identified by the switch statement. The compiler can be very clever and creative in the structure of this series of jumps that reduce the number of jump instructions that need to be executed by the processor. However, for some specialized processors, a compiler may not yet exist. Programming is then done via assembly language that can be easily converted into the machine code. But the writing of a switch, or switch-like, instruction in assembly language for present processors is cumbersome, awkward to use, difficult to optimize, and yields difficult to read assembler code that is hard to visually ensure is correct.

There is a need for a switch instruction in assembler code, with a respective processor arranged to handle the associated opcode.

This presents a technical problem for which a technical solution is needed using a technical means.

BRIEF SUMMARY

In one implementation a processor has an instruction fetch circuit fetching instructions, the instruction fetch circuit having an input and an output and a decode circuit to decode the fetched instructions, the decode circuit having a first and second input, and an output, wherein the decode circuit first input is coupled to the instruction fetch circuit output receiving the fetched instructions, and an execution circuit executing the decoded fetched instructions, the execution circuit having an input coupled to the decode circuit output to receive the decoded fetched instructions, and a switch instruction circuit (SIC) to detect and execute switch instructions of the fetched instructions, the SIC having an input and an output, wherein the SIC input is coupled to the instruction fetch circuit output to receive the fetched instructions, wherein the SIC output is coupled to the decode circuit second input and the instruction fetch circuit input.

A method is disclosed that includes in one implementation a processor fetching an opcode instruction through an input of the processor and then determining whether the fetched opcode instruction is a switch instruction, and when the opcode instruction is determined to be a switch instruction performs the switch instruction at a switch instruction circuit of the processor, and when the opcode instruction is determined not to be a switch instruction then decoding the opcode instruction to obtain a decoded instruction and performing the decoded instruction at an execution circuit of the processor.

BRIEF DESCRIPTION OF THE DRAWINGS

The techniques disclosed are illustrated by way of examples and not limitations in the figures of the accompanying drawings. Same numbered items are not necessarily alike.

The accompanying Figures illustrate various non-exclusive examples of the techniques disclosed.

FIG. 10 illustrates, generally at 1000, wherein the switch instruction circuit executes a first instruction located in a switch table at a switch table entry address.

FIG. 11 illustrates, generally at 1100, wherein the switch instruction includes a size for one or more fixed sized instruction blocks in a switch table, and a pointer address to a first instruction in the one or more fixed sized instruction blocks in the switch table to execute.

FIG. 12 illustrates, generally at 1200, when the pointer address to the first instruction in the one or more fixed sized instruction blocks in the switch table to execute exceeds an address of a combined sizes of the one or more fixed sized instruction blocks in the switch table the pointer address of the first instruction to execute is adjusted to an address of a last of the one or more fixed sized instruction blocks in the switch table.

FIG. 13 illustrates, generally at 1300, when the one or more fixed sized instruction blocks that is called has a first instruction of a jump (JUMP instruction) nothing is pushed onto a stack as a result of the first instruction being the JUMP instruction.

FIG. 14 illustrates, generally at 1400, when the one or more fixed sized instruction blocks that is called has a first instruction of a call (CALL instruction) an address past the end of a combined sizes of the one or more fixed sized instruction blocks is pushed onto a stack regardless of which of the one or more fixed sized instruction blocks are called as a result of the first instruction being the CALL instruction.

FIG. 15 illustrates, generally at 1500, wherein a circuit calculates an instruction address of a first instruction following the switch table.

FIG. 16 illustrates, generally at 1600, wherein the switch instruction provides an instruction address of a switch table entry to execute.

FIG. 17 illustrates, generally at 1700, when the calculated instruction address of the switch table entry to execute is beyond an address that is a sum of a starting address of a switch table and the combined sizes of the one or more fixed sized instruction blocks switch table entries then the calculated instruction address is set to a last switch table entry.

DETAILED DESCRIPTION

Figure 1:
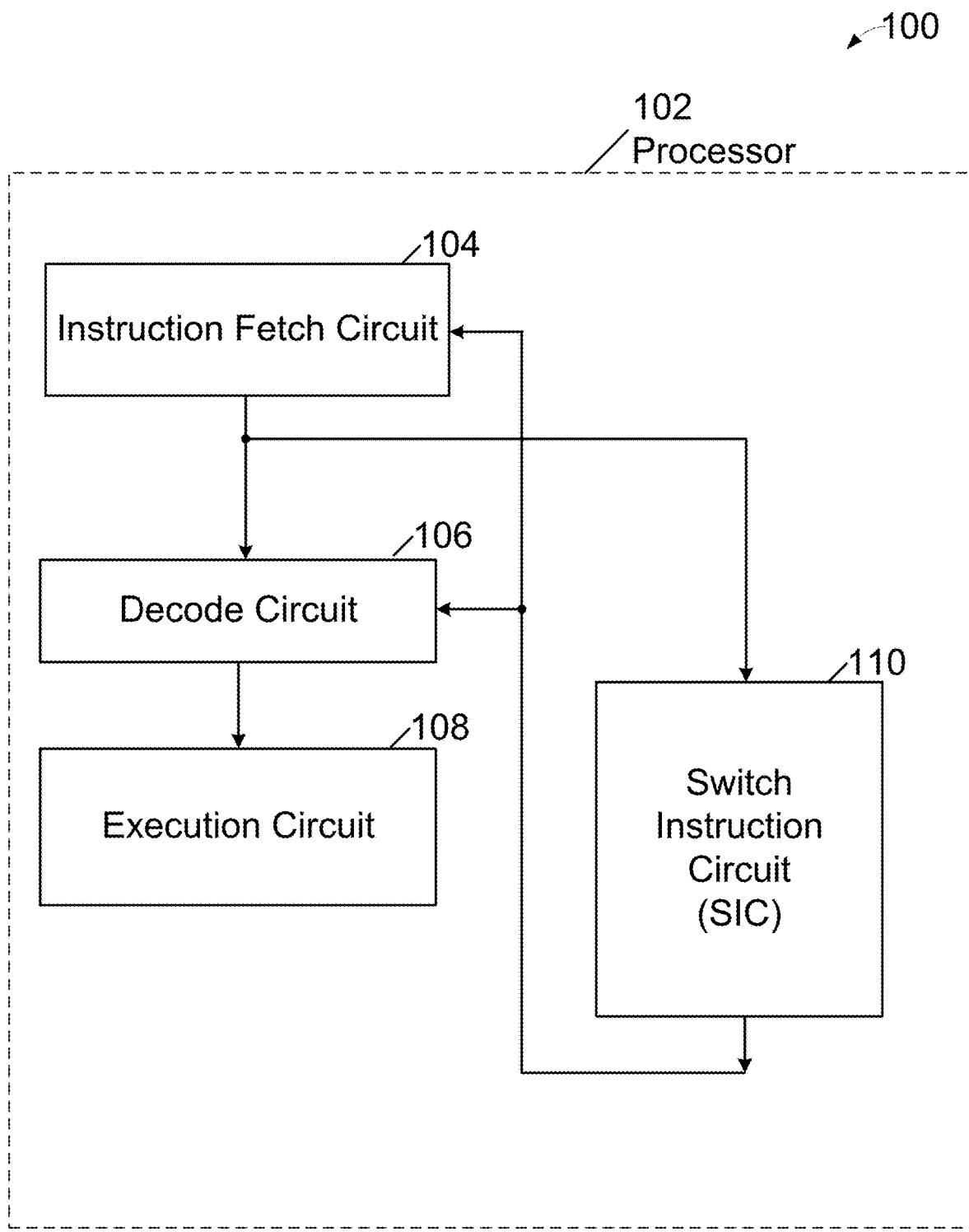
FIG. 1 illustrates, generally at 100, a block diagram of one example processor.

A processor switch instruction and a processor responsive to such a processor switch instruction is disclosed.

For illustrative purposes only the discussion below will limit the number of cases in the processor switch instruction to a small number to illustrate the techniques disclosed. The methods and techniques disclosed are not so limited.

The processor switch instruction disclosed has, as an example, the following form:

```
switch instruction (some_variable) {
    case 0: <code for when some_variable is 0>
    case 1: <code for when some_variable is 1>
    case 2: <code for when some_variable is 2>
    default: <code for when some_variable is 3 or more>
}
```

[The code illustrated immediately above from the beginning of the "switch instruction (some_variable) {" to the ending "}" is being denoted as Example Code 1 for purposes of discussion. Other notations will simply refer to "Example Code N" where N is replaced by a positive integer greater than 1.]

Example Code 1 above illustrates a 4 entry processor switch instruction having switch instruction table entry points for case 0:, case 1:, case 2:, and default:. The size of the switch instruction table is from the 1$^{st}$ instruction at case 0: to the last instruction of the default:.

The technique disclosed addresses similar constructs by a processor switch instruction, which may be simply called a SWITCH Instruction (aka switch instruction), that jumps to the code indicated by the value of some variable (denoted as some_variable). This is made possible by a predetermined allocated code-space for each of the case statements. If this predetermined allocated code-space is insufficient for the case, a jump (JUMP) or subroutine call (CALL) instruction as part of the switch instruction table can handle the excess code. The SWITCH instruction automatically handles each case having a first instruction of CALL in the switch instruction table by returning to the instruction that follows the SWITCH instruction. This yields improved readability in the assembly language. The use of a predetermined allocated code-space yields execution that ensures that one case statement does not run into the next and cause some other instruction to be executed.

In one illustrative implementation, the actions required by each switch instruction case can be reduced to either a JUMP or CALL instruction to jump to the instructions that implements the action.

In one illustrative implementation the SWITCH instruction is implemented as a 16-bit instruction with fields for: opcode, register, and size. The opcode (which may be 8 bits) identifies the SWITCH instruction. The register (which may be 4 bits) identifies a register that contains the value that determines which case in the switch instruction table is to be executed. The size (which may be 4 bits) identifies the size of the switch instruction table. The switch instruction table size is the combined size of all of the predetermined allocated code-spaces. The field "size" identifies the largest allowed value in the register, which value in the register may be considered an index to the switch instruction table. The indices to the switch instruction table are zero-based (i.e. starting the count at 0, rather than one-based starting the count at 1), 0-15 in the case of size being 4 bits. The number of cases is therefore the value of size+1.

In one illustrative implementation the predetermined allocated code-space for each of the case statements is 4 bytes, which is the size of the JUMP and CALL instructions for the particular processor of the example. In an example where the switch instruction table comprise only JUMP or CALL instructions, then the SWITCH instruction will jump to the appropriate JUMP or CALL. It is not a limitation to require only JUMP or CALL instructions in each of the cases, but a simplification that was made for sake of illustration.

In one illustrative implementation of a processor 102, an instruction fetch circuit 104, a decode circuit 106 and a switch instruction circuit 110 of the processor 102 operate thusly, and with reference to FIG. 1.

When the instruction fetch circuit 104 fetches an instruction, instruction fetch circuit 104 outputs the fetched instruction to decode circuit 106 and to switch instruction circuit 110. Switch instruction circuit 110 is illustrated as a separate circuit from both instruction fetch circuit 104 and decode circuit 106, however this is not meant to be limiting in any way. In one example, switch instruction circuit 110 is part of decode circuit 106. In one example, switch instruction circuit 110 may be at least partially integrated with instruction fetch circuit 104. Switch instruction circuit may also be partially integrated within execution circuit 108. Instruction fetch circuit is illustrated as having a single output coupled to both decode circuit 106 and switch instruction circuit 110, however this is not meant to be limiting in any way. In another example, multiple outputs are provided for fetch instruction circuit 104, fetch instruction circuit 104 identifies a SWITCH instruction and outputs the SWITCH instruction to switch instruction circuit 110. The switch instruction circuit 110 identifies a SWITCH instruction output by instruction fetch circuit 104 and operates thusly:

1. Switch instruction circuit 110 determines the address of the first instruction following the switch instruction table of the SWITCH instruction. It determines this from the instruction address of the SWITCH instruction, the length of the SWITCH instruction (2 bytes), and the number of bytes or words in the switch table, as indicated in the switch instruction, which number of bytes or words is the number of cases it has multiplied by the size pre-allocated to each case, 4 bytes in this example. The number of cases in the switch table is in the size field of the SWITCH instruction plus 1, since a size of 0 means 1 case. In other words, the address of the first instruction following the switch instruction table=current address+size of switch instruction+(size*predetermined allocated code-space for each of the case statements).

2. Switch instruction circuit 110 determines the instruction address of the switch instruction table entry to execute. It determines this by adding an offset to the current SWITCH instruction address. The offset is calculated from the value in the register specified by SWITCH instruction. The calculation is: instruction address of SWITCH instruction+size of SWITCH instruction (2 bytes)+ (pre-allocated size (4 bytes) *value in register). However, if value in the register specified by the SWITCH instruction exceeds the size of the table, the size of the table is used instead which means the final table entry is the execution point when the register equals or exceeds the size of the table.

Switch instruction circuit 110 instructs instruction fetch circuit 104 as follows:

1. Instruction fetch circuit 104 discards any prefetched instructions to ensure they do not execute. (See further explanation below at Nota bene.)
2. The instruction at the address given by the switch instruction circuit 110, i.e. instruction at the address of the switch instruction table entry to execute, is fetched.
3. The fetched instruction may be executed by instruction fetch circuit 104 instead of the decode circuit 106. Since this is a specialized case, the instruction fetch circuit 104 can execute the instruction faster than handing it off to the decode circuit 106 and waiting. This execution is simplified when the instruction is limited to, for example, a JUMP or CALL, where instruction fetch circuit 104 already has most of the necessary circuits to carry out this instruction, and thus addition of certain circuitry enables instruction fetch circuit 104 to execute the fetched instruction. However, the invention is not so limited and for implementations that allow more complex operations in the switch instruction table, it may be preferred to allow the execution circuit 108 to execute the instruction or instruction sequence.
4. If the instruction is not a JUMP or CALL or any other instruction that a particular implementation does not support within a SWITCH instruction, a processor fault is declared and program execution of the switch instruction terminates.
5. The address specified by the fetched JUMP or CALL is used by instruction fetch circuit 104 to retrieve the instruction pointed to by the JUMP or CALL.
6. If the instruction is a JUMP, instruction fetch circuit 104 passes the retrieved target of the JUMP to decode circuit 106 for decoding and transfer to execution circuit 108 for execution, and continues fetching instructions as per normal.
7. If the instruction is a CALL, the same action as a JUMP is performed however, in addition, the address of the first instruction following the switch instruction table (received from decode circuit 106) is pushed onto a subroutine return stack by instruction fetch circuit 104. This ensures that when the subroutine completes, the subroutine will return to the first instruction following the switch instruction table instead of the instruction that follows the CALL.

Nota bene: Above, instruction fetch circuit 104 executes a switch instruction operation as follows: 1. It discards any prefetched instructions to ensure they do not execute." Please note that one of skill in the art is aware that modern processors predictively fetch instructions before it's known whether they should execute or not. If it's determined at a later point they should not execute, they are discarded from the queue of instructions to be executed. The techniques disclosed herein adds a new case of this discard operation. Furthermore, modern processors also speculatively execute instructions before it's known whether they should execute or not. In this case the processor also includes a sequence of instructions to undo any processor state that the speculatively executed instructions have modified. This sequence of instructions is enacted when the processor has determined the speculatively executed instructions should not have executed and need to be discarded and any modified state undone. The techniques disclosed herein adds a new case of this discard operation. That is, one of skill in the art is aware that many modern processors for the sake of speedup do speculative processing, go down instruction paths that later will be determined to be wrong, and this is handled by discarding or tossing results later to be determined to be incorrect in the originally executing instruction stream. This is called "prefetch discard" or "discarding", or "discarding instructions" or similar terms.

For illustrative purposes what follows is a comparison between the technique presented and a traditional SWITCH statement such as the SWITCH statement defined by the C programming language for conventional processors, which has been reduced to the assembly code by the C compiler.

SWITCH Instruction Example

```
SWITCH r0 3       // jump to index r0, switch table size = 3
    CALL operation_0
    JUMP operation_1
    CALL operation_2
    CALL operation_3_or_more
@all_the_calls_return_here
```

Example Code 2

Without SWITCH Instruction, Example Assembly Code

```
CMP r0 2                        // split 4 entries into 01 and 23 values
                                   (CMP=compare)
JUMP GE j23                     // r0 is 2 or 3-or-more
@j01                            // r0 is 0 or 1
CMP r1 1                        // test if r0 for 0 versus 1
JUMP GE operation_1             // r0 is 1
@operation_0                    // r0 is 0
CALL operation_0                // execute case 0
JUMP done
@operation_1                    // r0 is 1
CALL operation_1                // execute case 1
JUMP done
@j23                            // r0 is 2 or 3 or more
CMP r1 3                        // test if r0 for 2 versus 3+
JUMP GE operation_3_or_more     // r0 is 3 or more
@operation_2                    // r0 is 2
CALL operation_2                // execute case 2
JUMP done
@operation_3_or_more            // r0 is 3 or more
CALL operation_3_or_more        // execute case 3
@done
```

Example Code 3

This Example Code 3 is done via a binary search, which is logarithmically faster than a linear search.

For the 2 examples illustrated above [Example Code 2] and [Example Code 3] if we make these assumptions: for all cases that the JUMPs and CALLs are unpredicted branches and require 3 cycles to complete, and CMP requires 3 cycles to complete due to pipeline register access cycles then we get this type of performance improvement.

TABLE 1

| Size of switch instruction table | SWITCH instruction | binary search | linear search |
|---|---|---|---|
| 2 | 5 clock cycles | 12 clock cycles | 12 clock cycles |
| 4 | 5 clock cycles | 18 clock cycles | 12-48 clock cycles |
| 8 | 5 clock cycles | 24 clock cycles | 12-96 clock cycles |
| 16 | 5 clock cycles | 30 clock cycles | 12-192 clock cycles |

The SWITCH instruction is not only more readable code, it is much smaller code, far simpler to write, and substantially faster.

In one implementation, for example, the size of the switch instruction table for this code:

```
SWITCH
  call ...
  call ...
endswitch
```

Example Code 4 is largely the number of lines between the SWITCH instruction and endswitch.

In the following illustrative example the hex addresses are just for illustration.

Predetermined allocated code-space being for example:

```
address
0x1000 <code for when some_variable is 0>
0x2000 <code for when some_variable is 1>
0x3000 <code for when some_variable is 2>
0x4000 <code for when some_variable is 3 or more>
```

Example Code 5

And the coding
  0x0100 SWITCH instruction (some_variable)
  0x0101 case 0: Jump 0x1000
  0x0102 case 1: Call 0x2000
  0x0103 case 2: Jump 0x3000
  0x0104 default: Jump 0x4000

Example Code 6

Here the hex addresses shown (0x1000, 0x2000, 0x3000, 0x4000) are the instruction addresses of the code shown to the left of the addresses. These addresses are generated by an assembler when assembling the SWITCH instruction.

In the above pseudo code "SWITCH instruction (some_variable)" the term some_variable was used to indicate the case statement that was to be executed. At the machine code level as indicated earlier the instruction is opcode, register, size. In the examples below we use "[reg]" to indicate the content of the register called reg. For example, in one implementation, reg may be r0, r1, . . . , r15 or k0, k1, . . . , k15.

Likewise, the addresses following a JUMP or CALL may also be generated by an assembler and the code itself may use symbolic names. For example, the code may be:

```
SWITCH instruction [reg]
  JUMP abc
  CALL def
  JUMP ghi
```

```
  JUMP jkl
ENDSWITCH
...
@abc    // The first JUMP will jump to the code that follows
this label - the assembler will resolve the address of the code
at this location
...
@ghi
...
@jkl
...
subroutine def   // The CALL will execute the subroutine
contained herein
...
Endsubroutine
```

Example Code 7

In this example the SWITCH instruction only refers to a register [reg] and does not refer to a size. In this example, when written in assembly language, the assembler can determine the "size" value itself and doesn't need the programmer to specify it, and the assembler provides the size for the processor switch instruction.

Note that in [Example Code 6] a Call will return to 0x0105, while a Jump does not as it changes the instruction stream. That is, a CALL returns but JUMP does not return, as JUMP passes execution control to some other address and the instructions from that address onward are executed. But a CALL has a RETURN instruction that returns execution to, in the case of this implementation, the address of the instruction that follows the ENDSWITCH (as seen in [Example Code 7]).

Illustrated below is an example of the handling of nested CALLs.

CALLs are often nested. If you CALL a subroutine from within the SWITCH instruction, the RETURN for that subroutine will return to the instruction that follows the SWITCH instruction. If a subroutine called from within the SWITCH instruction does a CALL to something else, the RETURN in that something else returns to the instruction that follows the corresponding CALL. The RETURN in the subroutine called from within the SWITCH instruction still returns to the instruction following the ENDSWITCH—it is therefore not affected by nested CALLS.

Furthermore, the nested CALLs may have SWITCH instructions. For example

```
SWITCH Instruction [reg]
  CALL abc
  ...
ENDSWITCH
// *1: this is where the RETURN from subroutine abc will
return to subroutine abc
  SWITCH instruction [reg]
    CALL def
    ...
  ENDSWITCH
  // *2: this is where the RETURN from subroutine def
  will return to
  RETURN    // this will return to *1
endsubroutine
subroutine def
  SWITCH instruction [reg]
    CALL def
    ...
  ENDSWITCH
```

-continued

```
    RETURN    // this will return to *2
Endsubroutine
```

Example Code 8

In some of the code illustrations above there is an ENDSWITCH and in others there is not. Rather than prespecifying the size to figure out the return address for a CALL instruction, which is one past the end of the predetermined allocated code-spaces, the assembler can figure out the return address for a CALL instruction if ENDSWITCH is used. That is, size can be determined by the assembler, which makes it easier for a programmer, however it means the assembler may need the ENDSWITCH so it can work out the size or some similar mechanism that heralds the end of the switch block. This ENDSWITCH indicator is used by the assembler and need not generate any machine code.

In some implementations, the SWITCH instruction case range may be limited. For example, if the case range is 0 to 15, that is 16 cases, then if more cases are needed in one example then multiple SWITCH instruction instances may be provided, which the assembler can handle. For example, if the need is for a 0-63 case range, that is, 64 cases then the following SWITCH instruction illustrative machine instructions cover that range: SWITCH00-15 instruction, SWITCH16-31 instruction, SWITCH32-47 instruction, SWITCH48-63 instruction. Thus multiple processor switch instructions instances may be provided to handle a larger range than the range of a single switch instruction.

In such an example, when the assembler encounters a SWITCH instruction, it may count how many cases are in it, and it may then generate the appropriate machine code for the SWITCH instruction accordingly. In the case of 18 cases, the assembler will generate machine code for the respective instance of SWITCH instructions, i.e. a SWITCH16-31 instruction with the 4-bit size set to 2. SWITCH16-31 instruction means the number of cases determined by the assembler is between 16 and 31, in this case 18. But there are 18 cases that can be executed, depending on the value of the register (as noted above denoted as [reg]).

The 4-bit size indicates if the table size is x+4-bit size+1. The +1 is because a 4-bit size of 0 means 1 entry. The value of x is determined from the machine code. The machine code for SWITCH00-15 instruction means x is 0, the machine code for SWITCH16-31 instruction means x is 16, the machine code for SWITCH32-47 instruction means x is 32, and the machine code for SWITCH48-63 instruction means x is 48.

When, for example, the assembler encounters the SWITCH instruction and the assembler determines the number of switch cases is in the range 16 to 31 and it's specifically 16 plus 4-bit size. If 4-bit size is 2, for example, the SWITCH16-31 instruction is specifying a switch table size of 16+2=18. Therefore, value 0-17 in the register will execute their corresponding case and values greater than 17 will go to case 17.

That is, the SWITCH16-31 machine instruction handles cases when the switch table has at least 16 cases but no more than 31. If the register specified by the switch instruction has a value 0-31, it will cause the corresponding case, 0, 1, 2, . . . or 31, to be executed next. If the register value exceeds 31, case 31 will be executed.

If the switch instruction table had 40 cases, then the assembler generates a SWITCH32-48 instruction with a 4-bit size equal to 8, since 32+8 is 40. The register values 0-39 result in the corresponding case 0, 1, 2, . . . , 39 to be executed and all other register values result in case 39 being executed.

Thus with a 4-bit size, a single SWITCH instruction can support a table size up to 16 (0-15). But a different processor SWITCH instruction can support a table size of up to 32 and a yet different processor SWITCH instruction can support a table size of up to 48, without limitation.

What has been illustrated is a 4 bit value for size, however, the implementations are not so limited and using multiple instructions and registers it is possible to have a size of any value.

FIG. 1 illustrates, generally at 100, a block diagram for one example of the techniques disclosed, and operates as described above. At 102 is a processor which has within it an Instruction Fetch Circuit 104, a Decode Circuit 106 a Switch Instruction Circuit (SIC) 110, and an Execution Circuit 108. Instruction Fetch Circuit 104 is in communication with Decode Circuit 106 and SIC 110. SIC 110 is in communication with Decode Circuit 106, and Decode Circuit 106 is in communication with Execution Circuit 108. Particularly, Decode Circuit 106 and SIC 110 are responsive to respective outputs of Instruction Fetch Circuit 104, and Decode Circuit 106 and Instruction Fetch Circuit 104 are responsive to respective outputs of SIC 110. Execution circuit 108 is responsive to an output of decode circuit 106.

In one example, instruction fetch circuit (104) is to fetch instructions, the instruction fetch circuit (104) having an input and an output. The instruction fetch circuit 104 fetches instructions from outside the processor 102, from for example, memory. This connection to memory outside the processor 102 is not shown in FIG. 1 so as not to obscure the implementation. Once the instruction fetch circuit 104 has fetched an instruction it outputs this on the instruction fetch circuit 104 output which is connected to both the decode circuit 106 and the switch instruction circuit (SIC) 110. The instruction fetch circuit (104) input (not the hidden one to memory) is connected to the switch instruction circuit (SIC) 110 output.

The processor 102 also has a decode circuit 106 to decode the fetched instructions it receives from the instruction fetch circuit 104, the decode circuit having a first input which is coupled to the instruction fetch circuit 104 output, a second input which is coupled to the switch instruction circuit (SIC) 110 output to receive the fetched instructions, and an output which is coupled to the execution circuit 108.

The processor 102 also has an execution circuit 108 to execute the decoded fetched instructions (from instruction fetch circuit 104 as processed by decode circuit 106), the execution circuit 108 having an input to receive the decode circuit 106 output, wherein the execution circuit 108 input is coupled to the decode circuit 106 output to receive the decoded fetched instructions (from instruction fetch circuit 104 as processed by decode circuit 106).

The switch instruction circuit (SIC) 110 is to detect and execute switch instructions of the fetched instructions, the SIC 110 having an input and an output, wherein the SIC 110 input is coupled to the instruction fetch circuit 104 output to receive the fetched instructions, wherein the SIC 110 output is coupled to the decode circuit 106 second input and the instruction fetch circuit 104 input.

Figure 2:
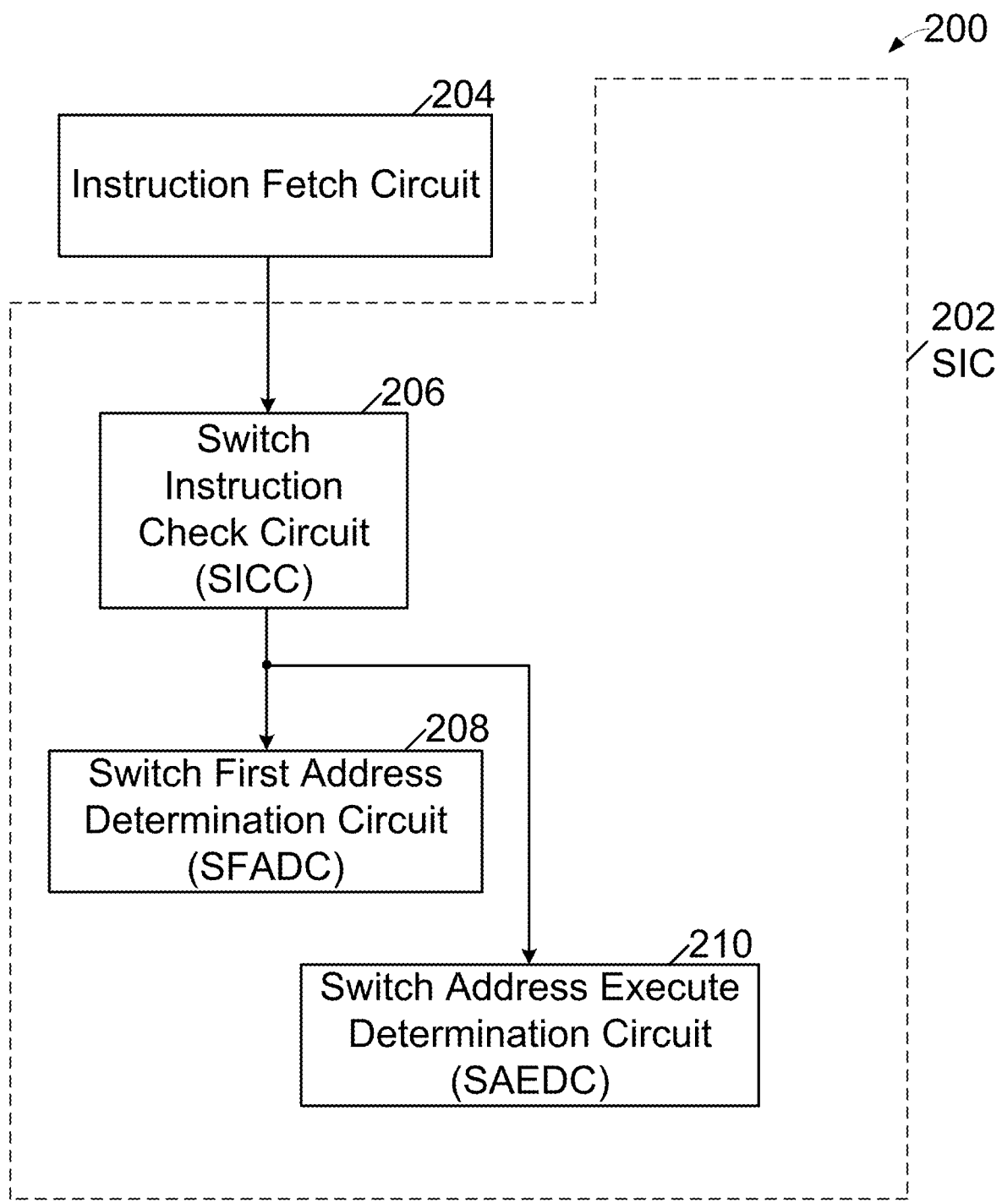
FIG. 2 illustrates, generally at 200, details of the Switch Instruction Circuit (SIC) of the processor of FIG. 1.

FIG. 2 illustrates, generally at 200, details of an example SIC 202. SIC 202 has within it a Switch Instruction Check Circuit (SICC) 206, a Switch First Address Determination Circuit (SFADC) 208, and a Switch Address Execute Determination Circuit (SAEDC) 210. Instruction Fetch Circuit 204, which may be an example of instruction fetch circuit 104, is in communication with SICC 206, i.e. SICC 206 is responsive to an output of instruction fetch circuit 204. SICC 206 is in communication with Switch First Address Determination Circuit (SFADC) 208 and Switch Address Execute Determination Circuit (SAEDC) 210, i.e. SFADC 208 and SAEDC 210 are responsive to respective outputs of SICC 206.

SICC 206 is a circuit to check for a SWITCH instruction output by instruction fetch circuit 204, SFADC 208 is a circuit to determine a first address of a SWITCH instruction and SAEDC 210 is a circuit to determine an execution address of a SWITCH instruction.

In one example, the SIC 202 which may be an example of SIC 110, includes the switch instruction check circuit (SICC) 206 having an input connected to the output of instruction fetch circuit 204 which may be an example of instruction fetch circuit 104 and an output connected to the input of switch first address determination circuit (SFADC) 208 and to the input of switch address execute determination circuit SAEDC 210, the SICC 206 to determine when the fetched instruction as received from the instruction fetch circuit 204 is the SWITCH instruction, the SICC 206 input coupled to the instruction fetch circuit 204 output. When the SICC 206 determines the fetched instruction as received from the instruction fetch circuit 204 is the SWITCH instruction, then in response the SICC 206 places the SWITCH instruction on the SICC 206 output. The SIC 202 also has switch first address determination circuit (SFADC) 208 having an input which is connected to the output of the SICC 206, the SFADC 208 to determine a first instruction address following a switch table, the SFADC 208 input coupled to the SICC 206 output. The SIC 202 also has a switch address execute determination circuit (SAEDC) 210 having an input which is connected to the SICC 206 output, the SAEDC 210 to determine an instruction address of an entry in the switch table to execute, the SAEDC 210 input coupled to the SICC 206 output. SIC 202 checks to see if an instruction received from the instruction fetch circuit 204 is a SWITCH instruction at SICC 206 and if it is a switch instruction then at SFADC 208 a switch first address is determined, and at SAEDC 210 a switch address to execute is determined.

Figure 3:
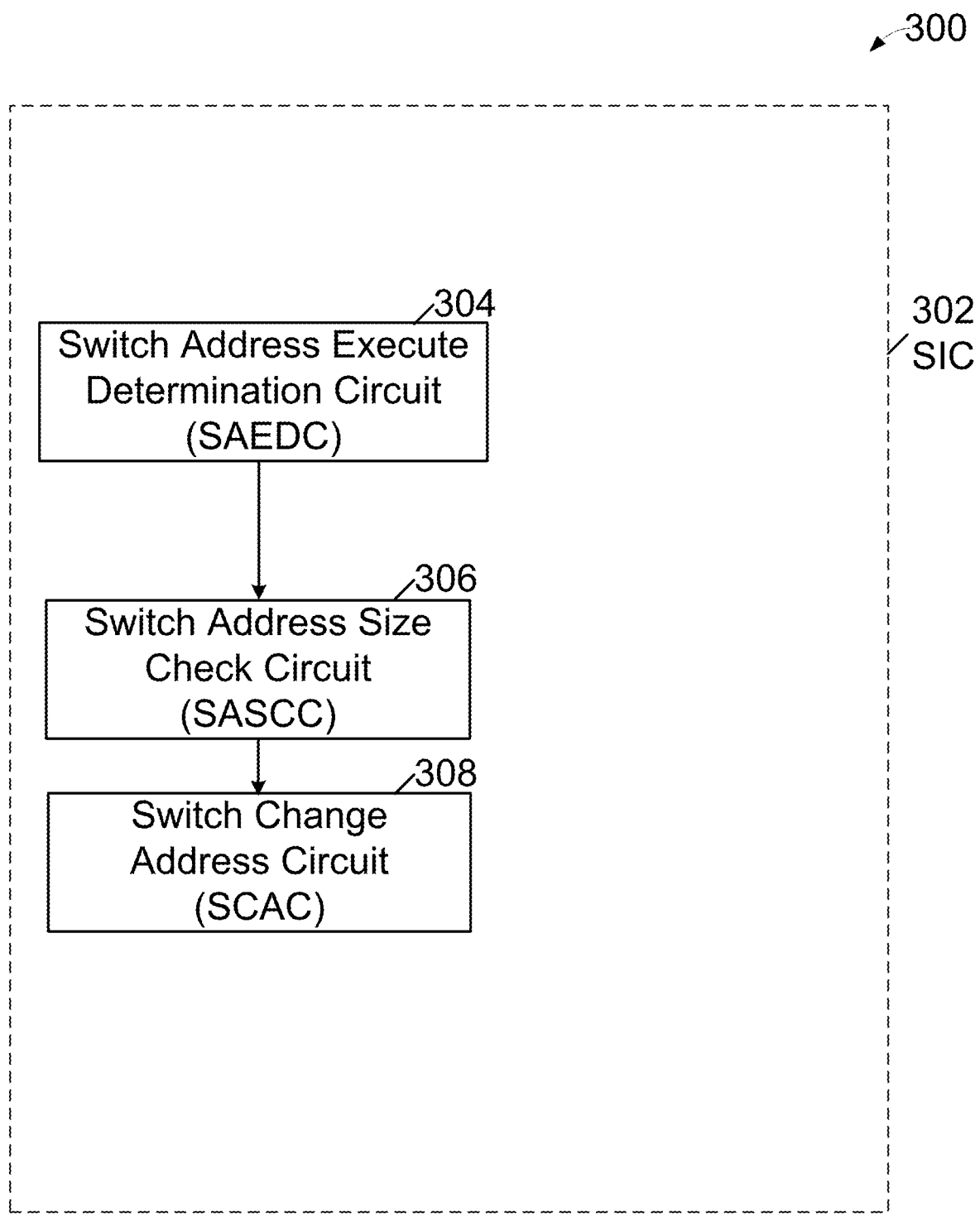
FIG. 3 illustrates, generally at 300, details of the Switch Instruction Circuit (SIC) of the processor of FIG. 1.

FIG. 3 illustrates, generally at 300, details of an example SIC 302. SIC 302 has within it a Switch Address Execute Determination Circuit (SAEDC) 304, a Switch Address Size Check Circuit (SASCC) 306 and a Switch Change Address Circuit (SCAC) 308. SAEDC 304 is in communication with SASCC 306, which SASCC 306 is responsive to an output of SAEDC 304. SASCC 306 is in communication with SCAC 308, which SCAC 308 is responsive to an output of SASCC 306.

SAEDC 304 is a circuit to determine an execution address of a switch instruction, SASCC 306 is a circuit to check the switch address size and SCAC 308 is a circuit to change the switch address.

In one example, SIC 302 which may be an example of switch instruction circuit SIC 110 includes: switch address size check circuit (SASCC) 306 having an input and an output, the SASCC 306 input coupled to the SAEDC 304 output, the SASCC 306 to determine if the instruction address of the entry in the switch table to execute exceeds a size of the switch table, the SASCC 306 input coupled to an output of the SAEDC 304. SIC 302 includes switch change address circuit (SCAC) 308 having an input which is coupled to the SASCC 306 output, the SCAC 308 to change the instruction address of the entry in the switch table to execute that exceeds the size of the switch table to a last case address in the switch table, the SCAC 308 input coupled to the SASCC 306 output. The SASCC 306 checks the switch address size and SCAC 308 changes that address if needed.

Figure 4:
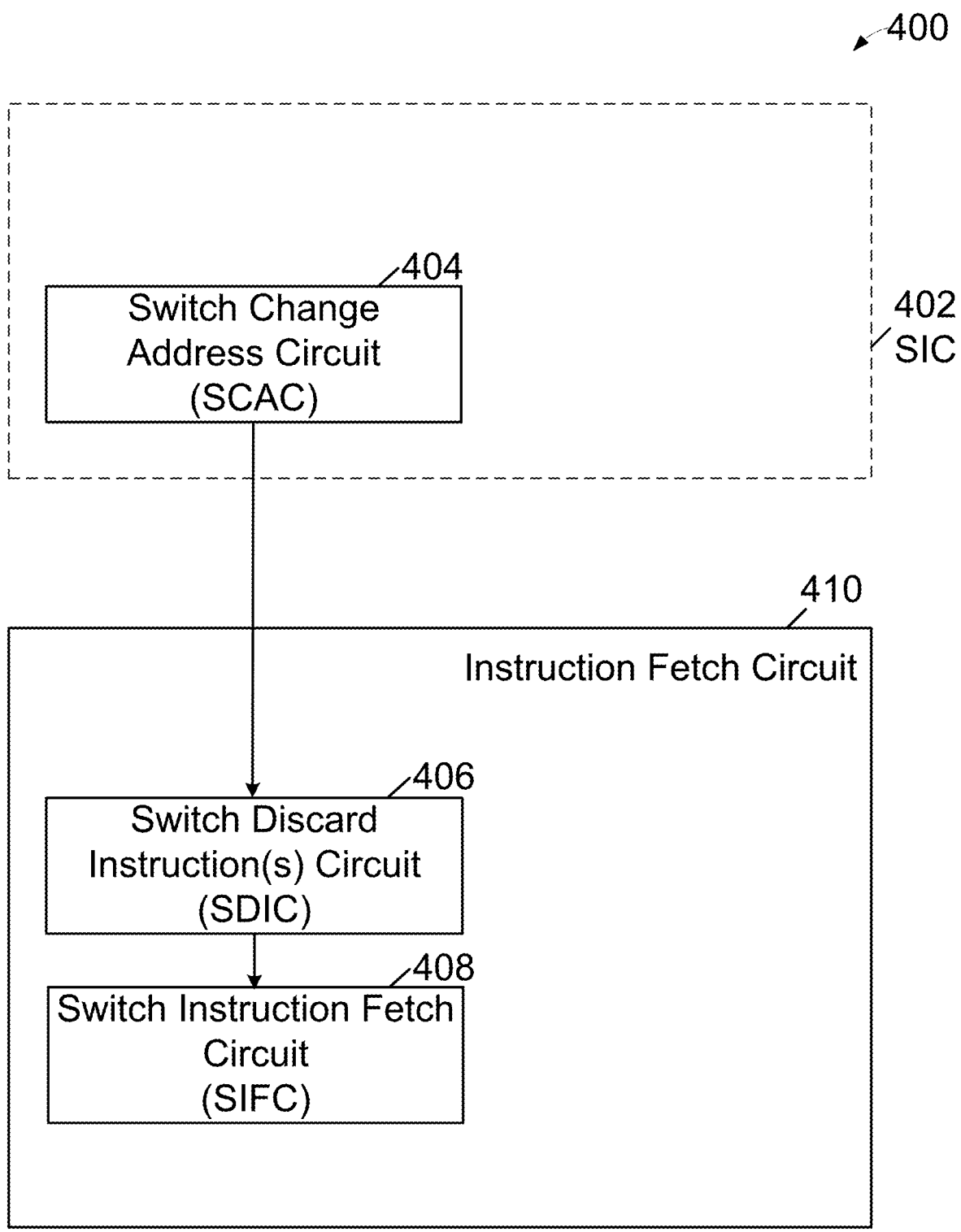
FIG. 4 illustrates, generally at 400, details of the Switch Instruction Circuit (SIC) of the processor of FIG. 1.

FIG. 4 illustrates, generally at 400, details of an example SIC 402. SIC 402 has within it a Switch Change Address Circuit (SCAC) 404 having an output that goes to an example Instruction Fetch Circuit 410 which has within it a Switch Discard Instruction(s) Circuit (SDIC) 406 and a Switch Instruction Fetch Circuit (SIFC) 408. SCAC 404 is in communication with SDIC 406 which SDIC 406 is responsive to an output of SCAC 404. SDIC 406 is in communication with SIFC 408, which is responsive to an output of SDIC 406.

SCAC 404 is a circuit to change the switch address, SDIC 406 is a circuit to discard switch instruction(s) and SIFC 408 is a circuit to fetch a switch instruction. In some examples, as indicated above, SDIC 406 and SIFC 408 may be integrated as part of instruction fetch circuit 104. In some examples one or more of SDIC 406 and SIFC 408 may be integrated as part of SIC 402.

In one example, the instruction fetch circuit 104 of FIG. 1 is to pre-fetch instructions and comprises switch discard instruction(s) circuit (SDIC) 406 having an input which is connected to the SCAC 404 output, and an output which is connected to the SIFC 408 input, the SDIC 406 to discard any pre-fetched instructions, the SDIC 406 input coupled to the SCAC 404 output; and the SIC 402, which may be an example of SIC 110, includes the SCAC 404 . . . . Switch instruction fetch circuit (SIFC) 408 has an input which is connected to the SDIC 406 output, the SIFC 408 to fetch a switch target instruction at the instruction address of the entry in the switch table entry to execute, the SIFC 408 input coupled to the SIDC 406 output. The SDIC 406 discards switch instructions if needed, and SIFC 408 fetches a switch instruction. SIFC 408 may fetch the plurality of instructions machine code lines that form the switch instruction.

Figure 5:
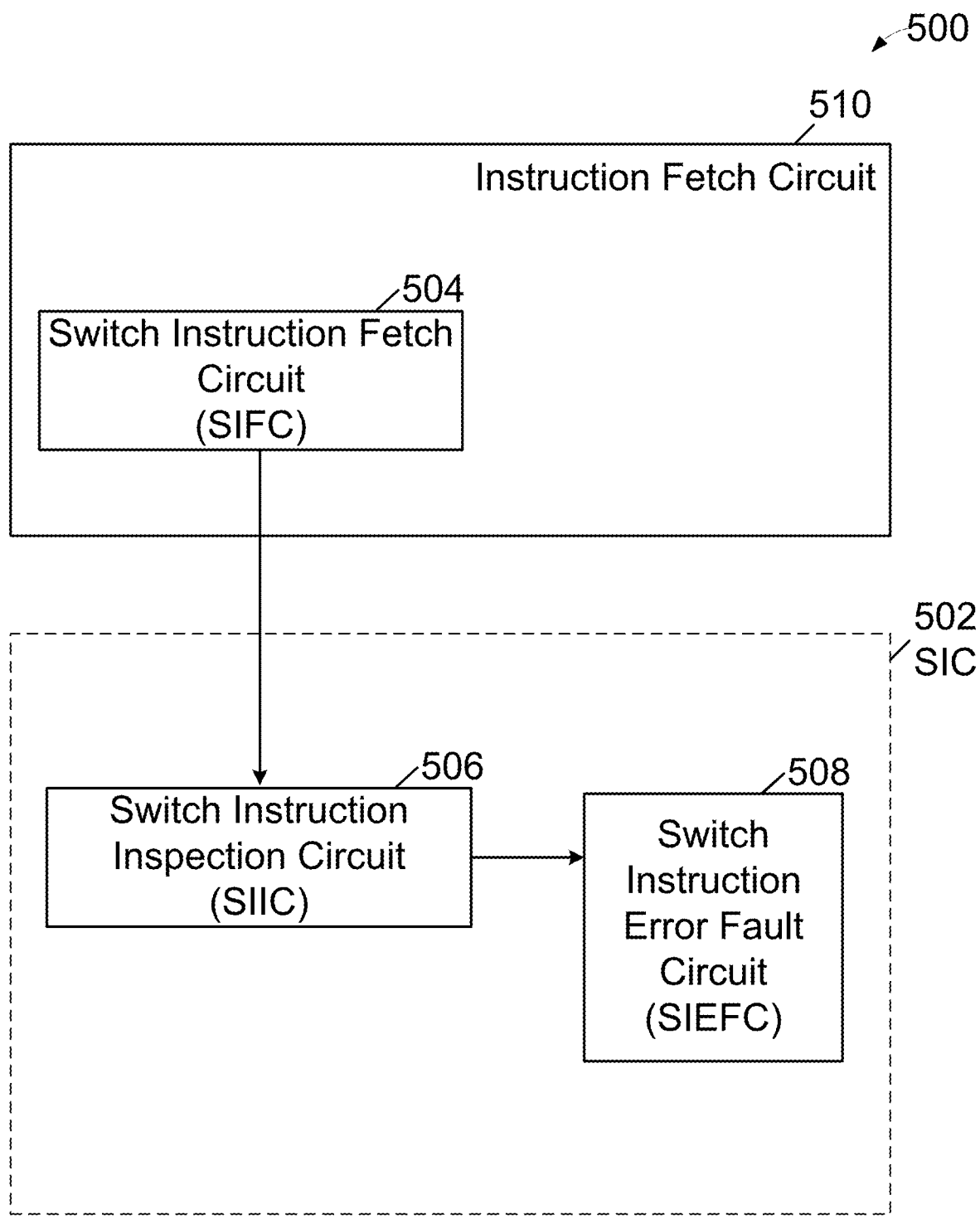
FIG. 5 illustrates, generally at 500, details of the Switch Instruction Circuit (SIC) of the processor of FIG. 1.

FIG. 5 illustrates, generally at 500, details of an example SIC 502. SIC 502, which may be an example of SIC 510, has within it a Switch Instruction Inspection Circuit (SIIC) 506 and a Switch Instruction Error Fault Circuit (SIEFC) 508. SIIC 506 receives from an example Instruction Fetch Circuit 510 which has within it a Switch Instruction Fetch Circuit (SIFC) 504, which may be an example of SIFC 408 and is in communication with SIIC 506, which SIIC 506 is responsive to an output of SIFC 504. SIIC 506 is in communication with SIEFC 508, which SIEFC is responsive to an output of SIIC 506.

SIFC 504 is a circuit to fetch a switch instruction, SIIC 506 is a circuit to inspect a switch instruction and SIEFC 508 is a circuit to detect an error fault in a switch instruction. In some examples, as indicated above, SIFC 504 may be integrated as part of instruction fetch circuit 104.

In one example, the SIC 502 includes: SIIC 506 having an input which is connected to the SIFC output, and an error output which is connected to the SIEFC 508 input, the SIIC 506 to determine when the instruction at the instruction address of the entry in the switch table to execute is not a jump (JUMP instruction) and not a call (CALL instruction) and generate an error signal on the error output which is connected to the SIEFC 508 input when it is determined that the instruction at the instruction address of the entry in the switch table to execute is not the jump (JUMP instruction) and not the call (CALL instruction). The SIEFC 508 has an input which is connected to the SIIC 506 error output, the SIEFC 508 to halt execution of the fetched switch target instruction when the error signal is received on the input from the SIIC 506 error output, the SIEFC 508 input coupled to the SIIC 506 error output. The SIIC 506 receives on its input from SIFC 504 an switch instruction and inspects it. If the switch instruction is found to be in error then SIIC 506 communicates an error condition via its error output (the only output shown in FIG. 5) to SIEFC 508. The above is described in an example wherein only a JUMP or a CALL instruction is supported by the SWITCH instruction, however this is not meant to be limiting in any way. In another example, other instructions may be supported, and in such an example, SIIC 506 to determine when the instruction at the instruction address of the entry in the switch table to execute is not a supported instruction, and generates an error signal on the error output which is connected to the SIEFC 508 input when it is determined that the instruction at the instruction address of the entry in the switch table to execute is not a supported instruction.

Figure 6:
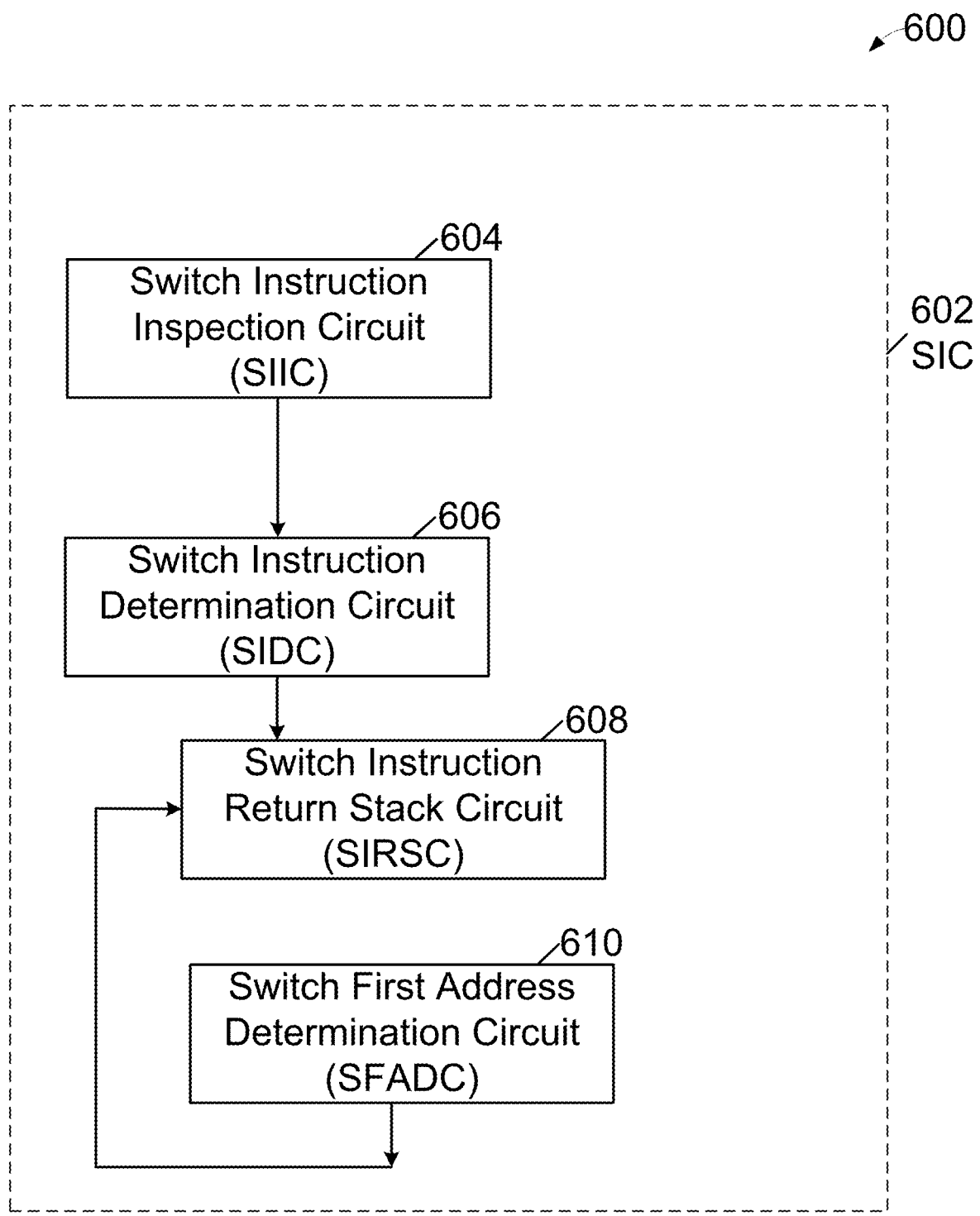
FIG. 6 illustrates, generally at 600, details of the Switch Instruction Circuit (SIC) of the processor of FIG. 1.

FIG. 6 illustrates, generally at 600, details of an example SIC 602. SIC 602, which may be an example of SIC 110, has within it a Switch Instruction Inspection Circuit (SIIC) 604, a Switch Instruction Determination Circuit (SIDC) 606, a Switch Instruction Return Stack Circuit (SIRSC) 608 and a Switch First Address Determination Circuit (SFADC) 610. SIIC 604 is in communication with SIDC 606, which SIDC 606 is responsive to an output of SIIC 664. SIDC 606 is in communication SIRSC 608, which SIRSC 608 is responsive to an output of SIDC 606. SFADC 610 is in communication with SIRSC 608, which SIRSC 608 is responsive to an output of SFADC 610.

SIIC 604 is a circuit to inspect a switch instruction, SIDC 606 is a circuit to determine a switch instruction, SIRSC 608 is a circuit for the switch instruction return stack and SFADC 610 is a circuit to determine the switch instruction first address.

In one example, the SIC 602 includes: the SIIC 604 having an output which is connected to the SIDC 606 input, the SIIC 604 to determine when the instruction at the instruction address of the entry in the switch table to execute is a jump (JUMP instruction) or a call (CALL instruction) and place the switch target instruction on the output of the SIIC 604 when it is determined that the instruction at the instruction address of the entry in the switch table to execute is the jump (JUMP instruction) or the call (CALL instruction). The SFADC 610 has an output which is connected to the second input of the SIRSC and is to place on the output of SFADC 610 the first instruction address following the switch table.

The SIDC 606 has an input which is connected to the SIIC 604 output, and an output which is connected to the first input of the SIRSC 608, the SIDC 606 input coupled to the SIIC 604 output, the SIDC 606 to determine if the fetched switch target instruction is the CALL instruction and if the fetched switch target instruction is the CALL instruction place the CALL instruction on the output of the SIDC 606 which is connected to the first input of SIRSC 608.

The SIRSC 608 has a first input which is connected to the output of the SIDC 606, and a second input which is connected to the second input of the SIRSC 608, the first input coupled to the SIDC 606 output, the second input coupled to the SFADC 610 output, the SIRSC 608 to put on a return stack the first instruction address following the switch table when the output of the SIDC 606 is the CALL instruction. The SFADC 610 determines the first instruction address following the switch table and presents it to SIRSC 608 which places it on a return stack only if SIDC 606 determines the fetched switch target instruction is the CALL instruction.

Figure 7:
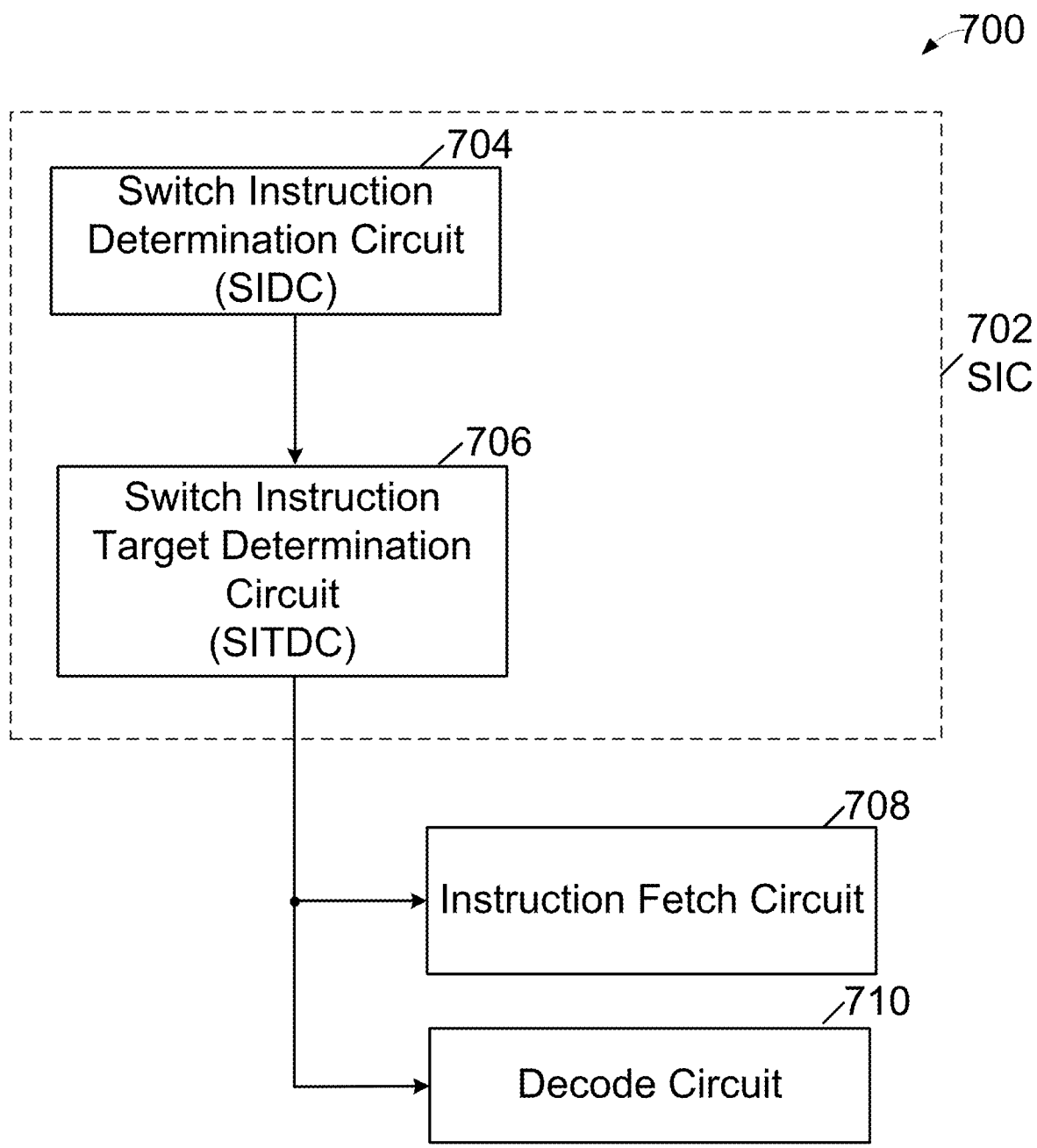
FIG. 7 illustrates, generally at 700, details of the Switch Instruction Circuit (SIC) of the processor of FIG. 1 and communications with the Instruction Fetch Circuit, and the Decode Circuit of the processor of FIG. 1.

FIG. 7 illustrates, generally at 700, details of an example SIC 702 and communications with an Instruction Fetch Circuit 708, and a Decode Circuit 710. SIC 702 may be an example of SIC 110. Within the SIC 702 is Switch Instruction Determination Circuit (SIDC) 704 in communication with Switch Instruction Target Determination Circuit (SITDC) 706, which SITDC 706 is responsive to an output of SIDC 704. SITDC 706 communicates outside of the SIC 702 with the Instruction Fetch Circuit 708 and the Decode Circuit 710, which instruction fetch circuit 708 and decode circuit 710 are responsive to respective outputs of SITDC 706.

SIDC 704 is a circuit to determine a switch instruction, SITDC 706 is a circuit to determine a switch instruction target and Instruction Fetch Circuit 708 is a circuit to fetch an instruction. Instruction fetch circuit 708 may be an example of instruction fetch circuit 104. Decode circuit 710 may be an example of decode circuit 106. Decode Circuit 710 is a circuit to decode the determined target on the SITDC 706 output.

In one example, the SIC 702 includes: the SIDC 704 having a second output which is connected to the SITDC 706 input, the SIDC 704 second output set to the fetched switch target instruction; the SITDC 706 has an input which is coupled to the SIDC second output, and an output which is connected to the Instruction Fetch Circuit 708 and the Decode Circuit 710, the SITDC 706 input coupled to the SIDC 704 second output, the SITDC 706 to determine a target of the JUMP instruction or the CALL instruction and place the determined target on the SITDC 706 output; and wherein the SITDC 706 output is coupled to the instruction fetch circuit 708 input, and is coupled to the decode circuit 710 second input.

The SITDC 706 output goes to the instruction fetch circuit 708, to fetch the determined target on the SITDC 706 output and as indicated above, goes to the decode circuit 710, and thus can affect their operation.

Figure 8:
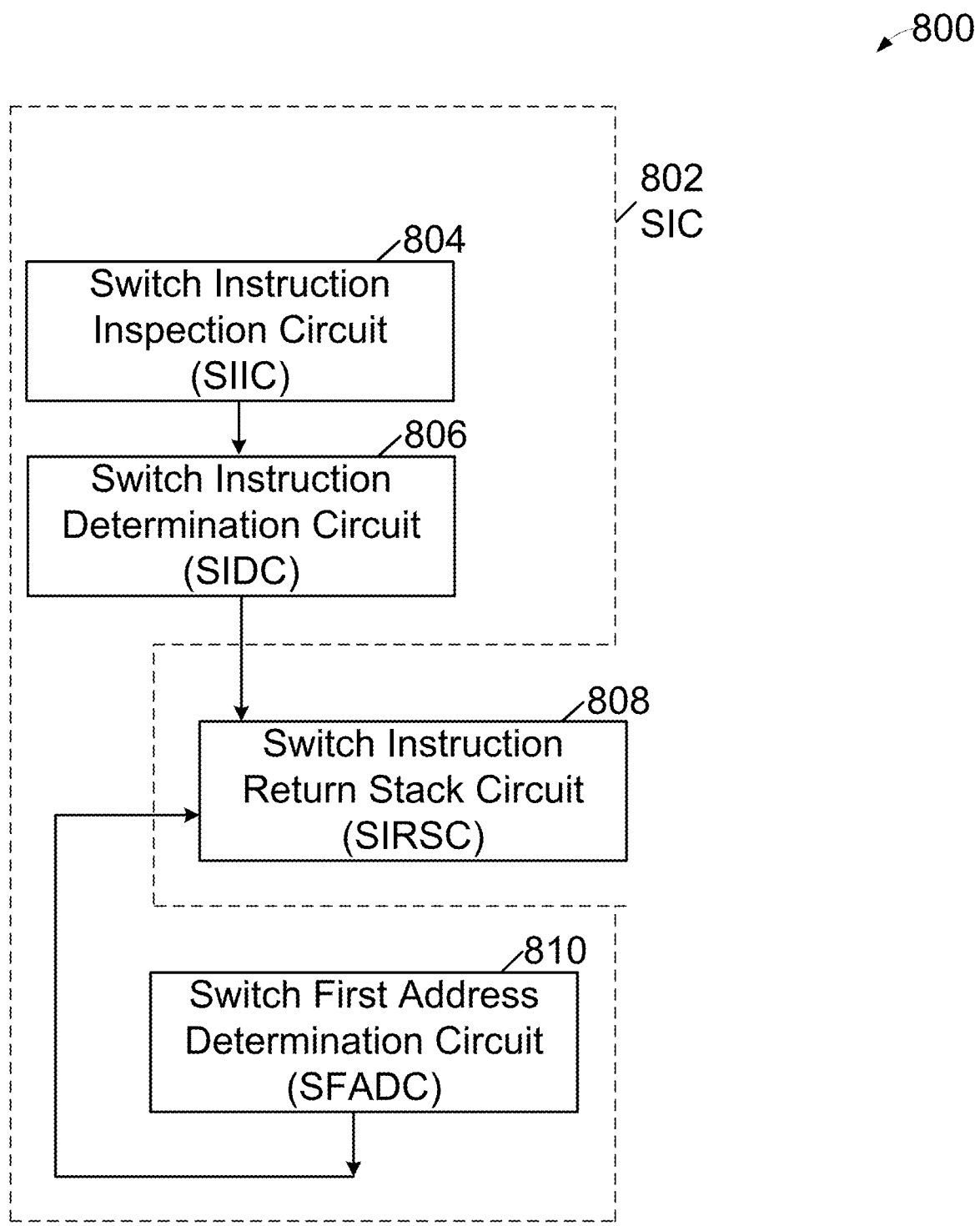
FIG. 8 illustrates, generally at 800, details of the Switch Instruction Circuit (SIC of the processor of FIG. 1) and communications with the Switch Instruction Return Stack Circuit (SIRSC) of the processor of FIG. 1.

FIG. 8 illustrates, generally at 800, details of an example Switch Instruction Circuit (SIC) 802 and communications with a Switch Instruction Return Stack Circuit (SIRSC) 808. SIC 802 may be an example of SIC 110. Within the SIC 802 is a Switch Instruction Inspection Circuit (SIIC) 804, a Switch Instruction Determination Circuit (SIDC) 806 and a Switch First Address Determination Circuit (SFADC) 810. SIIC 804 is in communication with SIDC 806, which SIDC 806 is responsive to an output of SIIC 804. SIRSC 808 is responsive to an output of SIDC 806 and to an output of SFADC 810.

SIIC 804 is a circuit to inspect a switch instruction, SIDC 806 is a circuit to determine a switch instruction, SFADC 810 is a circuit to determine the switch instruction first address and SIRSC 808 is a circuit for a return stack of the switch instruction.

In one example, the SIRSC 808 is a same stack used by processor 102 when not executing the switch instruction, i.e. SIRSC 808 is used by the processor when not executing a switch instruction, that is, for example, the processor's stack for regular operations. In this example it is shown that the switch instruction can use the processor's stack used for regular operations versus in another example is shown a dedicated switch instruction stack distinct from the processor's stack used for regular operations.

Figure 9:
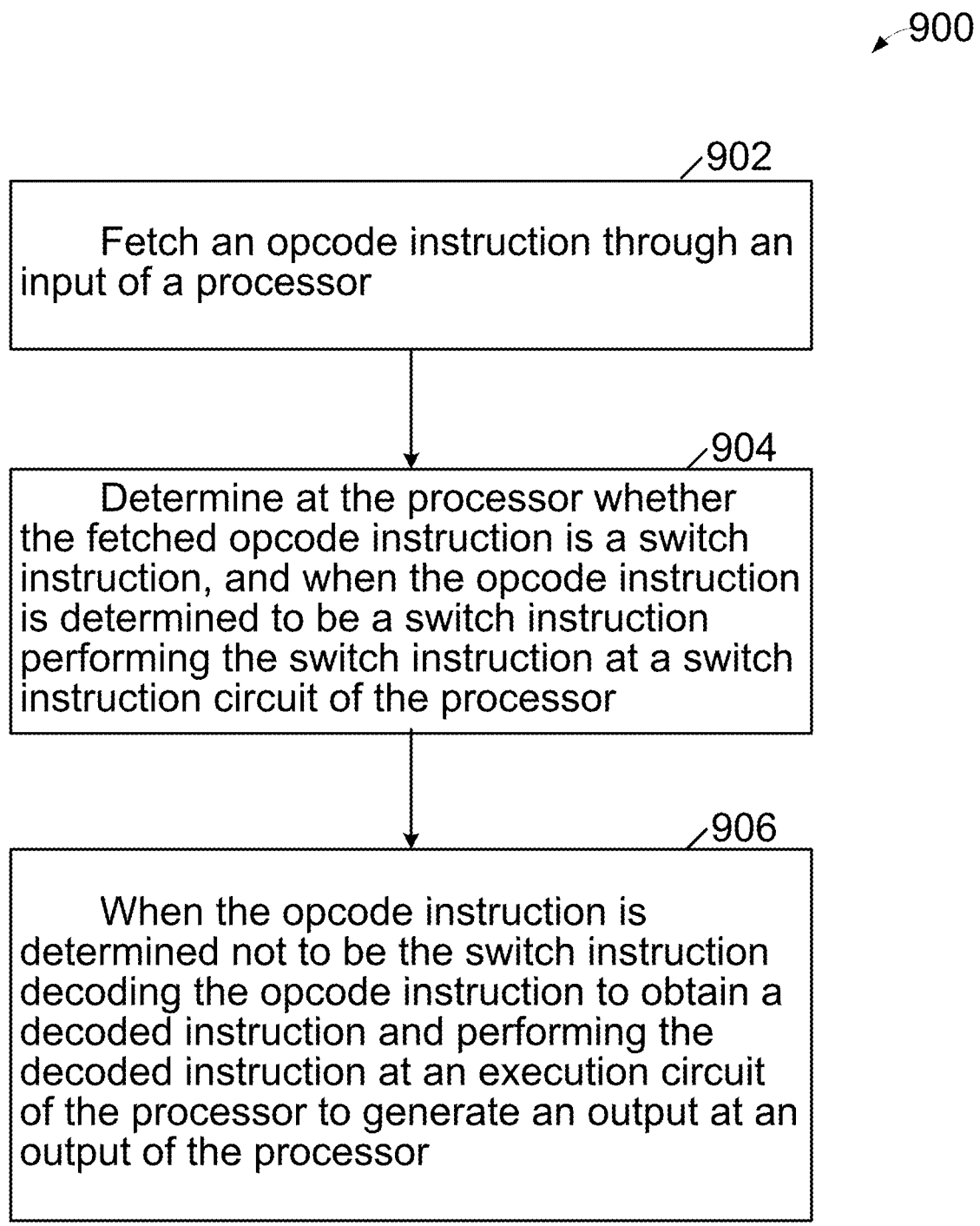
FIG. 9 illustrates, generally at 900, a flow chart beginning with a fetch.

FIG. 9 illustrates, generally at 900, a flow chart beginning with a fetch. At 902 an opcode instruction is fetched through an input of a processor, then proceed to 904. At 904, it is determined at the processor whether the fetched opcode instruction is a switch instruction, and when the opcode instruction is determined to be a switch instruction the switch instruction is performed at a switch instruction circuit of the processor, then proceed to 906. At 906, when the opcode instruction is determined not to be a switch instruction, the fetched opcode instruction is decoded to obtain a decoded instruction and the decoded instruction is performed at an execution circuit of the processor. This may generate an output at an output of the processor.

In one example, the flow chart beginning with a fetch may be an example of a method which method includes: fetching an opcode instruction through an input of a processor, for example, as shown in FIG. 1 the instruction fetch circuit 104 fetches instructions from outside the processor 102, from for example, memory. This connection to memory outside the processor 102 is not shown in FIG. 1 so as not to obscure the implementation. The method may include determining at the processor, for example FIG. 1 at 102, whether the fetched opcode instruction is a switch instruction, for example FIG. 2 at SICC 206, and when the opcode instruction is determined to be a switch instruction performing the switch instruction at a switch instruction circuit, for example FIG. 1 at SIC 110 of the processor, for example FIG. 1 at 102. When the opcode instruction is determined not to be the switch instruction, the method may include decoding the opcode instruction to obtain a decoded instruction, for example FIG. 1 at 106, and performing the decoded instruction at an execution circuit, for example FIG. 1 at 108 of the processor 102. This may generate an output at an output of the processor.

FIG. 10 illustrates, generally at 1000, wherein the switch instruction circuit, for example SIC 110, executes a first instruction located in a switch table at a switch table entry address 1002, as part of the method, for example as fetched by SIFC 408 in FIG. 4.

FIG. 11 illustrates, generally at 1100, wherein the switch instruction includes a size for one or more fixed sized instruction blocks in a switch table, and a pointer address to a first instruction in the one or more fixed sized instruction blocks in the switch table to execute 1102.

In one example, the method includes wherein the switch instruction, for example as fetched by Instruction Fetch Circuit 104 in FIG. 1, includes a size for one or more fixed sized instruction blocks, for example as checked by SASCC 306 in FIG. 3, in a switch table, and a pointer address to a first instruction in the one or more fixed sized instruction blocks in the switch table to execute, for example as determined by SAEDC 210 in FIG. 2.

FIG. 12 illustrates, generally at 1200, when the pointer address to the first instruction in the one or more fixed sized instruction blocks in the switch table to execute exceeds an address of a combined sizes of the one or more fixed sized instruction blocks in the switch table the pointer address of the first instruction to execute is adjusted to an address of a last of the one or more fixed sized instruction blocks in the switch table 1202.

In one example, the method thus included when the pointer address to the first instruction in the one or more fixed sized instruction blocks in the switch table to execute exceeds an address of a combined sizes of the one or more fixed sized instruction blocks in the switch table, for example as checked at SASCC 306 in FIG. 3, the pointer address of the first instruction to execute is adjusted, for example as changed at SCAC 308 in FIG. 3, to an address of a last of the one or more fixed sized instruction blocks in the switch table.

FIG. 13 illustrates, generally at 1300, when the one or more fixed sized instruction blocks that is called has a first instruction of a jump (JUMP instruction) nothing is pushed onto a stack as a result of the first instruction being the JUMP instruction 1302.

In one example, the method thus includes wherein when the one or more fixed sized instruction blocks that is called has a first instruction of a jump (JUMP instruction), as determined by SIDC 606 in FIG. 6, nothing is pushed onto a stack as a result of the first instruction being the JUMP instruction. For example, in FIG. 6 SFADC 610 determines the first instruction address following the switch table and presents it to SIRSC 608 which places it on a return stack only if SIDC 606 determines the fetched switch target instruction is the CALL instruction, so when, for example, the instruction is a JUMP instruction, which is not a CALL instruction, nothing is pushed onto the stack as represented by, for example, SIRSC 608 in FIG. 6.

FIG. 14 illustrates, generally at 1400, when the one or more fixed sized instruction blocks that is called has a first instruction of a call (CALL instruction) an address past the end of a combined sizes of the one or more fixed sized instruction blocks is pushed onto a stack regardless of which of the one or more fixed sized instruction blocks are called as a result of the first instruction being the CALL instruction 1402.

In one example, the method thus includes wherein when the one or more fixed sized instruction blocks that is called has a first instruction of a call (CALL instruction), for example as determined by SIDC 606 in FIG. 6, an address past the end of a combined sizes of the one or more fixed sized instruction blocks, for example as determined by SFADC 610 in FIG. 6, is pushed onto a stack regardless of which of the one or more fixed sized instruction blocks are called as a result of the first instruction being the CALL instruction. For example, in FIG. 6, SFADC 610 determines the first instruction address following the switch table and presents it to SIRSC 608 which places it on a return stack if SIDC 606 determines the fetched switch target instruction is the CALL instruction.

FIG. 15 illustrates, generally at 1500, wherein a circuit calculates an instruction address of a first instruction following the switch table 1502.

In one example, the method thus includes, wherein a circuit, for example SFADC 810 in FIG. 8, calculates an instruction address of a first instruction following the switch table.

FIG. 16 illustrates, generally at 1600, wherein the switch instruction provides an instruction address of a switch table entry to execute 1602.

In one example, the method thus includes, wherein the switch instruction provides an instruction address of a switch table entry to execute, for example SIDC 806 in FIG. 8.

FIG. 17 illustrates, generally at 1700, when the calculated instruction address of the switch table entry to execute is beyond an address that is a sum of a starting address of a switch table and the combined sizes of the one or more fixed sized instruction blocks switch table entries then the calculated instruction address is set to a last switch table entry 1702.

In one example, the method thus includes wherein when the calculated instruction address of the switch table entry to execute is beyond an address that is a sum of a starting address of a switch table and the combined sizes of the one or more fixed sized instruction blocks switch table entries, for example as determined at SASCC 306 in FIG. 3, then the calculated instruction address is set to a last switch table entry, for example as changed in SCAC 308 FIG. 3.

Thus a processor switch instruction and a processor responsive to such a processor switch instruction has been described.

For purposes of discussing and understanding the examples, it is to be understood that various terms are used by those knowledgeable in the art to describe techniques and approaches. Furthermore, in the description, for purposes of explanation, numerous specific details are set forth in order to provide a thorough understanding of the examples. It will be evident, however, to one of ordinary skill in the art that the examples may be practiced without these specific details. In some instances, well-known structures and devices are shown in block diagram form, rather than in detail, in order to avoid obscuring the examples. These examples are described in sufficient detail to enable those of ordinary skill in the art to practice the examples, and it is to be understood that other examples may be utilized and that logical, mechanical, and other changes may be made without departing from the scope of the examples.

As used in this description, "one example" or "an example" or similar phrases means that the feature(s) being described are included in at least one example. References to "one example" in this description do not necessarily refer to the same example; however, neither are such examples mutually exclusive. Nor does "one example" imply that there is but a single example. For example, a feature, structure, act, etc. described in "one example" may also be included in other examples. Thus, the invention may include a variety of combinations and/or integrations of the examples described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more examples where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

What is claimed is:

1. A processor comprising:
   an instruction fetch circuit to fetch instructions, the instruction fetch circuit having an input and an output;
   a decode circuit to decode the fetched instructions, the decode circuit having a first input, a second input, and an output, wherein the decode circuit first input is coupled to the instruction fetch circuit output to receive the fetched instructions;
   an execution circuit to execute the decoded fetched instructions, the execution circuit having an input, wherein the execution circuit input is coupled to the decode circuit output to receive the decoded fetched instructions; and
   a switch instruction circuit (SIC) to detect and execute switch instructions of the fetched instructions, the SIC having an input and an output, wherein the SIC input is coupled to the instruction fetch circuit output to receive the fetched instructions, wherein the SIC output is coupled to the decode circuit second input and the instruction fetch circuit input.

2. The processor of claim 1 wherein the SIC comprises:
   a switch instruction check circuit (SICC) having an input and an output, the SICC to determine when the fetched instruction is the switch instruction, the SICC input coupled to the instruction fetch circuit output;
   wherein when the SICC determines the fetched instruction is the switch instruction then the SICC places the switch instruction on the SICC output;
   a switch first address determination circuit (SFADC) having an input, the SFADC to determine a first instruction address following a switch table of the switch instruction, the SFADC input coupled to the SICC output; and
   a switch address execute determination circuit (SAEDC) having an input, the SAEDC to determine an instruction address of an entry in the switch table to execute, the SAEDC input coupled to the SICC output.

3. The processor of claim 2 wherein the SIC comprises:
   a switch address size check circuit (SASCC) having an input and an output, the SASCC to determine if the instruction address of the entry in the switch table to execute exceeds a size of the switch table, the SASCC input coupled to an output of the SAEDC; and
   a switch change address circuit (SCAC) having an input, the SCAC to change the instruction address of the entry in the switch table to execute that exceeds the size of the switch table to a last case address in the switch table, the SCAC input coupled to the SASCC output.

4. The processor of claim 3 wherein the instruction fetch circuit to pre-fetch instructions comprises:
   a switch discard instruction(s) circuit (SDIC) having an input and an output, the SDIC to discard any pre-fetched instructions, the SDIC input coupled to the SCAC output; and
   a switch instruction fetch circuit (SIFC) having an input, the SIFC to fetch a switch target instruction at the instruction address of the entry in the switch table entry to execute, the SIFC input coupled to the SDIC output.

5. The processor of claim 2 wherein the SIC comprises:
   a switch instruction inspection circuit (SIIC) having an input, and an error output, the SIIC to determine when the instruction at the instruction address of the entry in the switch table to execute is not a jump (JUMP instruction) and not a call (CALL instruction) and generate an error signal on the error output when it is determined that the instruction at the instruction address of the entry in the switch table to execute is not the jump (JUMP instruction) and not the call (CALL instruction); and
   a switch instruction error fault circuit (SIEFC) having an input, the SIEFC to halt execution of the fetched switch target instruction when the error signal is received on the input, the SIEFC input coupled to the SIIC error output.

6. The processor of claim 5 wherein the SIC comprises:
   the SIIC having an output, the SIIC to determine when the instruction at the instruction address of the entry in the switch table to execute is a jump (JUMP instruction) or a call (CALL instruction) and place the switch target instruction on the output when it is determined that the instruction at the instruction address of the entry in the switch table to execute is the jump (JUMP instruction) or the call (CALL instruction);

the SFADC having an output to place on the output the first instruction address following the switch table;

a switch instruction determination circuit (SIDC) having an input, and an output, the SIDC input coupled to the SIIC output, the SIDC to determine if the fetched switch target instruction is the CALL instruction and if the fetched switch target instruction is the CALL instruction place the CALL instruction on the output of the SIDC; and a switch instruction return stack circuit (SIRSC) having a first input, a second input, the first input coupled to the SIDC output, the second input coupled to the SFADC output, the SIRSC to put on a return stack the first instruction address following the switch table when the output of the SIDC is the CALL instruction.

7. The processor of claim 6 wherein the SIC comprises:

the SIDC having a second output, the SIDC second output set to the fetched switch target instruction;

a switch instruction target determination circuit (SITDC) the SITDC having an input and an output, the SITDC input coupled to the SIDC second output, the SITDC to determine a target of the JUMP instruction or the CALL instruction and place the determined target on the SITDC output; and wherein the SITDC output is coupled to the instruction fetch circuit input, and is coupled to the decode circuit second input.

8. The processor of claim 6 wherein the SIRSC is a same stack used by the processor when not executing the switch instruction.

9. A method comprising:

fetching an opcode instruction through an input of a processor;

determining at the processor whether the fetched opcode instruction is a switch instruction, and when the opcode instruction is determined to be a switch instruction performing the switch instruction at a switch instruction circuit of the processor wherein the switch instruction is executed in its entirety as a single instruction;

when the opcode instruction is determined not to be the switch instruction decoding the opcode instruction to obtain a decoded instruction and performing the decoded instruction at an execution circuit of the processor, wherein the switch instruction includes a size for one or more fixed sized instruction blocks in a switch table of the switch instruction, and a pointer address to a first instruction in the one or more fixed sized instruction blocks in the switch table to execute, and wherein when the one or more fixed sized instruction blocks that is called has a first instruction of a call (CALL instruction), an address past the end of a combined sizes of the one or more fixed sized instruction blocks is pushed onto a stack regardless of which of the one or more fixed sized instruction blocks are called, as a result of the first instruction being the CALL instruction.

10. The method of claim 9 wherein a circuit calculates an instruction address of a first instruction following the switch table.

11. The method of claim 9 wherein the switch instruction provides an instruction address of a switch table entry to execute.

12. The method of claim 11 wherein when the calculated instruction address of the switch table entry to execute is beyond an address that is a sum of a starting address of a switch table and the combined sizes of the one or more fixed sized instruction blocks switch table entries then the calculated instruction address is set to a last switch table entry.

* * * * *